United States Patent [19]

Suzuki et al.

[11] Patent Number: 4,734,348

[45] Date of Patent: Mar. 29, 1988

[54] PHOTOSENSITIVE MEMBER FOR ELECTROPHOTOGRAPHY CONTAINING POLYVINYL ACETAL

[76] Inventors: Tetsumi Suzuki, 8-8, Takamori 4-chome, Isehara-shi, Kanagawa; Tetsuo Murayama, 15-20, Tamagawagakuen 8-chome, Machida-shi, Tokyo; Shinji Aramaki, Populagaoka Co-op. 10-201, 10-1, Naruse 2-chome, Machida-shi, Tokyo, all of Japan

[21] Appl. No.: 920,728

[22] Filed: Oct. 17, 1986

[30] Foreign Application Priority Data

Oct. 23, 1985 [JP] Japan .................................. 60-236964

[51] Int. Cl.$^4$ .................................................. G03G 5/05
[52] U.S. Cl. ........................................... 430/96; 430/58
[58] Field of Search ..................... 430/76, 75, 71, 96, 430/58

[56] References Cited

U.S. PATENT DOCUMENTS 3,844,985 10/1974 Fukutani et al. ..................... 430/76
4,492,747 1/1985 Brechlin ................................ 430/96

Primary Examiner—John L. Goodrow
Attorney, Agent, or Firm—David G. Conlin; Ernest V. Linek

[57] ABSTRACT

A photosensitive member for electrophotography comprising at least a photoconductive layer on a conductive substrate, the photoconductive layer containing polyvinyl acetal having a constituent unit represented by the following general formula [I]:

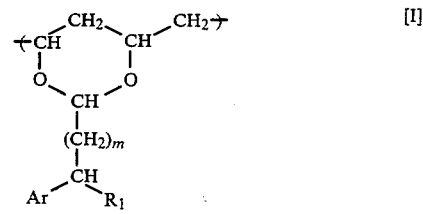

wherein Ar represents an aryl group, $R_1$ a hydrogen atom, a lower alkyl group or an arly group, and m an integer of 0 or 1-3, and a constituent unit represented by the following general formula [II]:

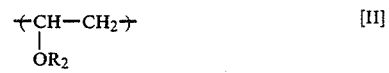

wherein $R_2$ represents a hydrogen atom or an acyl group, the constituent unit of the general formula [I] being 40 mole % or more, and the total of the constituent units of the general formulae [I] and [II] being 60 mole % or more. This photosensitive layer has high sensitivity and durability and low residual potential.

10 Claims, 4 Drawing Figures

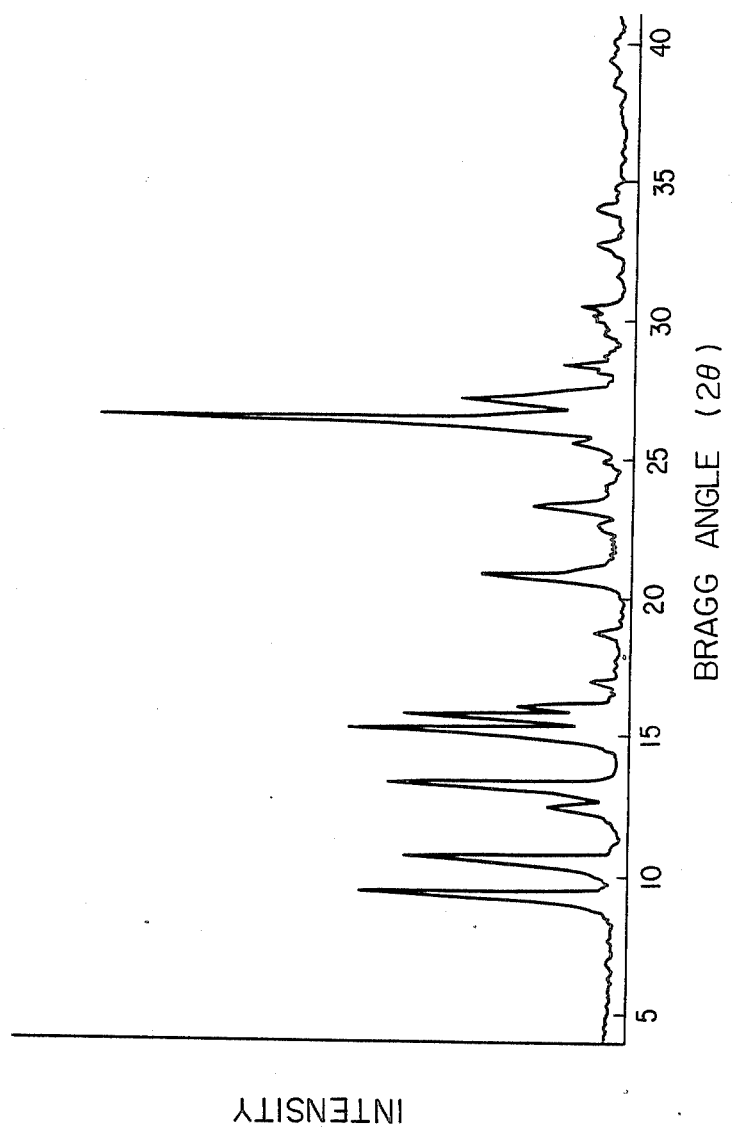

PHOTOSENSITIVE MEMBER FOR ELECTROPHOTOGRAPHY CONTAINING POLYVINYL ACETAL

BACKGROUND OF THE INVENTION

The present invention relates to a photosensitive member for electrophotography, and more particularly to a photosensitive member having a photoconductive layer containing a new binder polymer.

The photoconductive layers of photosensitive members for electrophotography were conventionally made from inorganic photoconductive materials such as selenium, cadmium sulfide, zinc oxide, etc. However, selenium not only needs to be recovered as a toxic material but also has poor heat resistance because it is crystallized by heat. Cadmium sulfide also needs to be recovered as a toxic material and has poor humidity resistance. As for zinc oxide, it has poor humidity resistance and insufficient durability for repeated copying. The, efforts have been made to develop new photoconductive layers.

Recently, research has been advanced on organic photoconductive compounds simply referred to as "OPC" for use in photosensitive members for electrophotography, and their use has been growing from year to year. The organic photoconductive compounds are superior to their inorganic counterparts in that they are lighter, easier to form into films, easier to manufacture into photosensitive members and even capable of providing transparent photosensitive members depending on the types employed.

Despite these advantages, organic photosensitive members for electrophotography composed of organic photoconductive compounds (referred to simply as "OPC photosensitive members") are inferior to their inorganic counterparts with respect to sensitivity and durability. Therefore, they have been used primarily in low-speed machines to date.

To improve the sensitivity and durability of the OPC photosensitive members, research has been carried out to develop new charge carrier generating materials. photoconductive compounds such as charge carrier transport materials, sensitizers, etc. On the other hand, binder polymers have not been well investigated so far despite the fact that they largely affect the properties of the resulting photosensitive members. As a matter of fact, most of the OPC photosensitive members practically used at present employ commercially available general-purpose polymers. Selection among a lot of commercially available polymers is made from the viewpoint of photosensitive properties and ease of production. Accordingly, these binder polymers are not necessarily suitable for having the photoconductive compounds fully exhibit their own properties. For instance, in those photosensitive members having photoconductive particles dispersed therein, the binder polymers are required to provide good stability to particle dispersion, and polyvinyl butyral is commonly used as such a binder. However, this binder is poor in the separation and injection of charge carriers and suffers from such problems as sensitivity decrease and residual potential increase. On the other hand, polyesters, polycarbonates, polystyrene, etc. are efficient in the separation and injection of charge carriers, but they fail to disperse photoconductive particles stably, resulting in the agglomeration of most photoconductive particles. Further, the dispersion stabilization treatment of such polymers leads to a decrease in sensitivity and electric properties such as residual potential, etc.

Thus, binder polymers having not only satisfactory properties such as electric properties necessary for photosensitive members but also high adaptability for manufacturing photosensitive members have not been found yet.

SUMMARY OF THE INVENTION

An object of the present invention is, therefore, to provide a photosensitive member for electrophotography having a photoconductive layer containing a polymer binder which can not only stably disperse photoconductive particles but which also has excellent electric properties.

Intense research has led to the discovery that the above object can be achieved by using as a binder polymer a new polyvinyl acetal, having not only excellent stability for the dispersion of photoconductive particles, but also excellent electric properties. The present invention is based on this discovery.

Thus, the photosensitive member for electrophotography according to the present invention has a photoconductive layer on a conductive substrate, the photoconductive layer containing a polyvinyl acetal haing a repeating unit represented by the following general formula [I]:

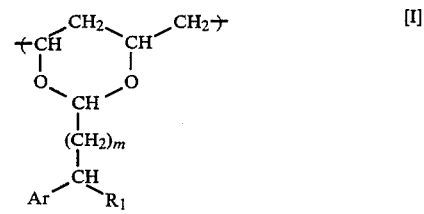

wherein Ar represents an aryl group; $R_1$ a hydrogen atom, a lower alkyl group or an aryl group; and m an integer of 0 or 1–3, and a repeating unit represented by the following general formula [II]:

wherein $R_2$ represents a hydrogen atom or an acyl group, the repeating unit [I] being 40 mole % or more and the total of the repeating units [I] and [II] being 60 mole % or more.

BRIEF DESCRIPTION OF THE DRAWINGS

FIG. 4 is a graph showing an X-ray diffraction spectrum of oxytitanium phthalocyanine used in Example 2.

DETAILED DESCRIPTION OF THE INVENTION

Figure 1:
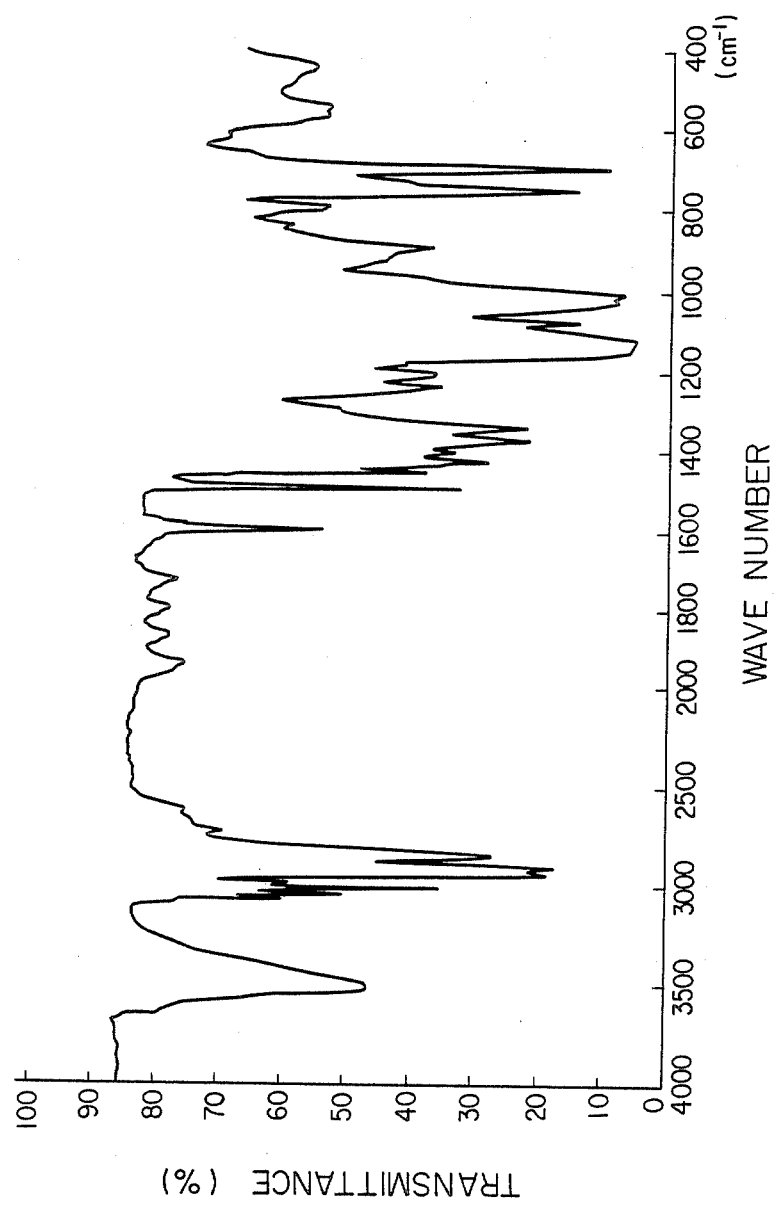
FIGS. 1–3 are graphs showing infrared spectra of the polymers prepared in Reference Examples 1–3, respectively.

In the polyvinyl acetal according to the present invention, the repeating unit represented by the general formula [I] has an aryl group which may be a monovalent group derived from aromatic hydrocarbons such as benzene, styrene, stilbene, biphenyl, terphenyl, naphthalene, anthracene, acenaphthene, acenaphthylene, fluorene, phenanthrene, etc., which may be substituted.

The substituents of this aryl group may be lower alkyl groups such as methyl, ethyl and butyl; alkoxy groups such as methoxy and ethoxy; aryloxy groups such as phenoxy and tolyloxy; arylalkyl groups such as benzyl and naphthyl methyl; arylalkoxy groups such as benzyloxy; substituted amino groups such as dimethylamino, diethylamino, dibenzylamino and diphenylamino; halogen atoms such as chlorine and bromine; and a hydroxy group.

The substituent $R_1$ may be a hydrogen atom; a lower alkyl group such as methyl, ethyl, propyl and butyl; and the above-mentioned aryl group.

The number "m" is an integer of 0 or 1–3.

In the repeating unit [II], the substituent $R_2$ is a hydrogen atom or an acyl group. It should be noted that in the polyvinyl acetal of the present invention containing a plurality of the constituent units [II], $R_2$ may be a hydrogen atom for some of the constituent units [II] and an acry group for the rest.

The acyl group represented by $R_2$ may include a lower aliphatic acyl group such as acetyl and propionyl; and an aromatic acyl group such as benzoyl, anisyl carbonyl and naphthoyl.

The polymer of the present invention contains 40 mole % or more, preferably 50 mole % or more of a repeating unit represented by the general formula [I], and the total of the repeating units [I] and [II] is 60 mole % or more, preferably 70 mole % or more. In other words, repeating units other than the above units [I] and [II] may be contained in the polymer in an amount of 40 mole % or less, preferably 30 mole % or less. Such other repeating units may include ethylene, styrene, methyl vinyl ether, etc.

The polyvinyl acetal of the present invention may be prepared from aldehydes and alcohols by known methods.

The alcohols which may be used include completely or partially saponified polyvinyl alcohols and their copolymers with various vinyl compounds. And the aldehydes which may be used include aldehydes corresponding to the aldehyde moiety (pendant group) in the formula [I] and acetals such as dimethyl acetals and diethyl acetals derived from such aldehydes.

The polyvinyl acetal of the present invention may be prepared from the above polyvinyl alcohol and the above aldehyde or its acetal in an organic solvent in the presence of an acid catalyst.

The organic solvents which may be used include alcohols such as methanol, ethanol, propanol and 2-methoxyethanol; ethers such as tetrahydrofuran and dioxane; ketones such as methyl ethyl ketone and methylisobutyl ketone; aromatic hydrocarbons such as toluene, xylene and chlorobenzene; halogenated hydrocarbons such as chloroform, dichloroethane and trichloroethylene, polar aprotic solvents such as N,N-dimethyl formamide, acetonitrile, N-methyl pyrrolidone and sulfolane; and esters such as ethyl acetate, methyl benzoate and methyl cellosolve acetate. Mixtures of these solvents or their mixtures with water may also be used.

The acids used as catalysts may be mineral acids such as hydrochloric acid and sulfuric acid, sulfonic acids such as p-toluene sulfonic acid and benzene sulfonic acid, etc.

The reaction proceeds at room temperature, but the reaction mixture is usually heated to accelerate the reaction. The reaction temperature is desirably 40°–100° C.

The polyvinyl acetal of the present invention has not only good dispersion stability for photoconductive particles but also is highly effective in the separation and injection of charge carriers. In addition, it is highly soluble in organic solvents and has good compatibility with various photoconductive compounds. Accordingly, the polyvinyl acetal of the present invention can be used as a binder polymer for various types of photoconductive layers, which are enumerated as follows:

(1) A photoconductive layer having photoconductive particles dispersed in a binder.
(2) A photoconductive layer of the above type (1) further containing a charge carrier transport material.
(3) A photoconductive layer containing an organic photoconductive compound, a sensitive and a polymer binder.
(4) A photoconductor layer of a laminate type having a charge carrier generating layer and a charge carrier transport layer.

Since the polyvinyl acetal of the present invention well ensures the stable dispersion of photoconductive particles and the separation and injection of charge carriers, it is particularly suitable as a binder polymer for the photoconductive layer having photoconductive particles dispersed therein and the charge carrier generating layer.

Next, the photosensitive member for electrophotography according to the present invention will be explained in detail.

A conductive substrate on which the photoconductive layer is to be formed may be any of those which can be used for conventional photosensitive members for electrophotography. Specifially, the conductive substrates may be, for instance, metal drums or sheets made of aluminum, stainless steel, copper, etc., laminates having foils of such metal or deposited layers of such metal. Plastic films, plastic drums, papers, paper tubes, etc. coated with conductive mixtures of conductive materials such as metal powder, carbon black, copper iodide, polyelectrolytes, etc. and proper binders may also be used as the conductive substrates. Further, sheets and drums of conductive plastics containing conductive materials such as metal powder, carbon black and carbon fibers may also be used. In addition to the above, plastic films and belts treated to have conductivity by conductive metal oxides such as tin oxide, indium oxide, etc. are also usable.

The photoconductive layer of any of the above types (1)–(4) is formed on such a conductive substrate, and if necessary, an undercoat, a bonding layer, a protective layer, a transparent, insulating layer, etc., may further be formed.

The components which form the photoconductive layers may include photoconductive particles, organic photoconductive compounds, charge carrier transport media, sensitizers, binder polymers, plasticizers, antioxidants, ultraviolet light absorbers, etc., and a proper combination of these additives are used depending on the types of the photoconductive layers.

The photoconductive particles used in combination with the polyvinyl acetal of the present invention are those generating charge carriers with high efficiency upon absorption of light. Typical examples of such photoconductive particles are inorganic, photoconductive particles of selenium, a selenium-tellurium alloy, a selenium-arsenic alloy, cadmium sulfide, zinc oxide, amorphous silicon, etc.; and organic, photoconductive particles of phthalocyanine pigments such as metal-free phthalocyanine, copper phthalocyanine, vanadyl phthalocyanine, aluminum phthalocyanine, titanyl phthalocyanine, indium phthalocyanine and magnesium phthalocyanine, perinone pigments, perylene pigments, anthraquinone pigments, polycyclic quinone pigments, azo pigments, quinacridone pigments, indigo pigments such as indigo and thioindigo, cyanine pigments, pyrylium salt pigments, thiapyrylium salt pigments, squarylium pigments, etc.

These photoconductive particles are dispersed in the polymer binder. The ratio of the photoconductive particles to the binder may vary depending upon the types of the photoconductive layers, but usually 10–2000 parts by weight, preferably 20–500 parts by weight of the binder is used per 100 parts by weight of the photoconductive particles.

The binder may be composed of the polyvinyl acetal of the present invention alone, but it may contain other polymers. Such other binder polymers include polymers and copolymers of vinyl compounds such as styrene, vinyl acetate, vinyl chloride, acrylates, methacrylates, vinyl alcohol and ethyl vinyl ether, other polyvinyl acetals, polycarbonates, polyesters, polyamides, polyurethanes, cellulose esters, cellulose ethers, phenoxy resins, silicone resins and epoxy resins.

Usable as the organic photoconductive compounds and the charge carrier transport material in the photosensitive member according to the present invention are electron-donating compounds simply called electron donors and electron-attracting compounds simply called electron acceptors. The electron-donating compounds may be polymers having heterocyclic pendant groups or condensed polycyclic pendant groups such as poly-N-vinyl carbazole and polystyryl anthracene, and as low-molecular compounds, heterocyclic compounds such as pyrazoline, imidazole, oxazole, oxadiazole, triazole and carbazole, triaryl amine derivatives such as triphenyl amine, phenylenediamine derivatives, N-phenyl carbazole derivatives, stilbene derivatives, hydrazone compounds, etc. The electron-attracting compounds may be trinitrofluoroenone, tetranitrofluorenone, tetracyanoethylene, etc.

These compounds may be used as charge carrier transport materials in layers having the photoconductive particles dispersed therein and in charge carrier transport layers in laminate-type photosensitive members, or may be used for photoconductive layers in which they are dissolved in polymer binders, if necessary, together with sensitizers such as dyes and electron-attracting compounds.

Typical examples of the sensitizers which may be used are dyes which include triphenylmethane dyes such as Methyl Violet, Brilliant Green and Crystal Violet; thiazine dyes such as Methylene Blue; quinone dyes such as Quinizaline; and cyanine dyes as well as pyrylium salts, thiapyrylium salts and benzopyrylium salts, and electron-attracting compounds which include quinones such as chloranil, 2,3-dichloro-1,4-naphthoquionone, 2-methylanthraquinone, 1-nitroanthraquinone, 1-chloro-5-nitroanthraquinone, 2-chloroanthraquinone and phenanthrenequinone; aldehydes such as 4-nitrobenzaldehyde; ketones such as 9-benzoylanthracene, indanedione, 3,5-dinitrobenzophenone, 2,4,7-trinitrofluorenone, 2,4,5,7-tetranitrofluorenone and 3,3′,5,5′-tetranitrobenzophenone; acid anhydrides such as phthalic anhydride and 4-chloronaphthalic anhydride; cyano compounds such as tetracyanoethylene, terephthalmalononitrile, 9anthrylmethylidenemalononitrile, 4-nitrobenzalmalononitrile and 4-(p-nitrobenzoyloxy)-benzalmalononitrile; phthalides such as 3-benzalphthalide, 3-(α-cyano-p-nitrobenzal)phthalide and 3-(α-cyano-p-nitrobenzal)-4,5,6,7-tetrachlorophthalide, etc.

The polyvinyl acetal of the present invention may be used as binders not only in layers having the photoconductive particles dispersed therein, but also in the charge carrier transport layers and the photoconductive layers containing organic photoconductive compounds and sensitizers.

The polyvinyl acetal of the present invention is added to the organic photoconductive compound or the charge carrier transport material, if necessary, together with the above polymers. The amount of the polyvinyl acetal may vary depending on whether the photoconductive compound is a high-molecular compound or a low-molecular compound. When the photoconductive compound is a high-molecular compound such as polyvinyl carbazole, the polyvinyl acetal of the present invention may be mixed in a small amount for improving the flexibility of the resulting photosensitive member. On the other hand, when the photoconductive compound is a low-molecular compound, a considerably large amount of the polyvinyl acetal should be used for a film-forming purpose. Incidentally, with respect to the photoconductive compound, it is usually 10–200 parts by weight, preferably 30–150 parts by weight per 100 parts by weight of the binder containing the polyvinyl acetal, when the photoconductive compound is a low-molecular compound.

Among the photosensitive members for electrophotography having various structures and compositions as explained above, the polyvinyl acetal of the present invention is suitable as a binder polymer particularly for those having the photoconductive layers having the photoconductive particles dispersed therein and those of the laminate type having the above photoconductive particle-dispersed layers as charge carrier generating layers.

The present invention will be explained in further detail by the following Examples. It should be noted, however, that they are not intended to limit the scope of the present invention. The term "part(s)" used in Examples means "part(s) by weight" unless specifically indicated otherwise.

REFERENCE EXAMPLE 1

10.0 parts of polyvinyl alcohol having a saponification ratio of 99.0–100 mole % (GOHSENOL NM-11 manufactured by the Nippon Synthetic Chemical Industry Co., Ltd.) was suspended in 250 parts of 1,2-dichloethane, and 39 parts of phenylacetaldehyde and one part of concentrated hydrochloric acid were added thereto. The resulting reaction mixture was stirred while heating at 55° C. for 5 hours. The reaction solution was poured into 1500 parts of methanol in which 1.5 parts of sodium acetate was dissolved to precipitate the resulting polyvinyl acetal. The polymer thus obtained was dissolved in tetrahydrofuran and precipitated again in methanol, and such purification procedures were repeated several times to remove the unreacted phenylacetaldehyde. Thus, 18.5 parts of a transparent, solid polymer was obtained.

The elemental analysis of this polymer provided the following results:

| Elemental Analysis | | |
| --- | --- | --- |
| | C | H |
| Measured | 74.24% | 7.42% |
| Calculated | 74.24% | 7.54% |

Calculated values were obtained assuming that this polymer had the following formula [III]:

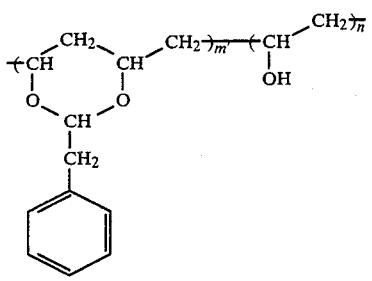  [III]

wherein m' is 0.75 and n is 0.25.

As is apparent from the above results, the measured values of carbon and hydrogen percentages in the polymer well coincide with the values calculated from the general formula [III].

Infrared spectrum was measured on this polymer in the form of a film. The result is shown in FIG. 1. As is apparent from FIG. 1, this is a polymer of acetal containing an aromatic ring.

An acetal ratio defined by the formula: $2m'/(2m'+n)$ was found 0.857 for this polymer. This measured value is sufficiently close to the theoretical value of 0.865 obtained from the above formula [III]. Taking the measurement errors of the elemental analysis into consideration, it may be concluded that the reaction to form acetal was almost completed.

REFERENCE EXAMPLE 2

The procedures of Reference Example 1 were repeated except for using 41 parts of β-phenylpropionaldehyde instead of phenylacetaldehyde. As a result, 18.5 parts of a polymer was obtained.

This polymer was subjected to elemental analysis. The results are as follows:

| Elemental Analysis | | |
| --- | --- | --- |
| | C | H |
| Measured | 74.99% | 7.95% |
| Calculated | 74.99% | 7.98% |

The calculated values were obtained assuming that the polymer had the following formula [IV]:

[IV]

wherein m' is 0.753 and n is 0.247.

As is apparent from the above results, the measured values well coincide with the values calculated from the formula [IV].

Figure 2:
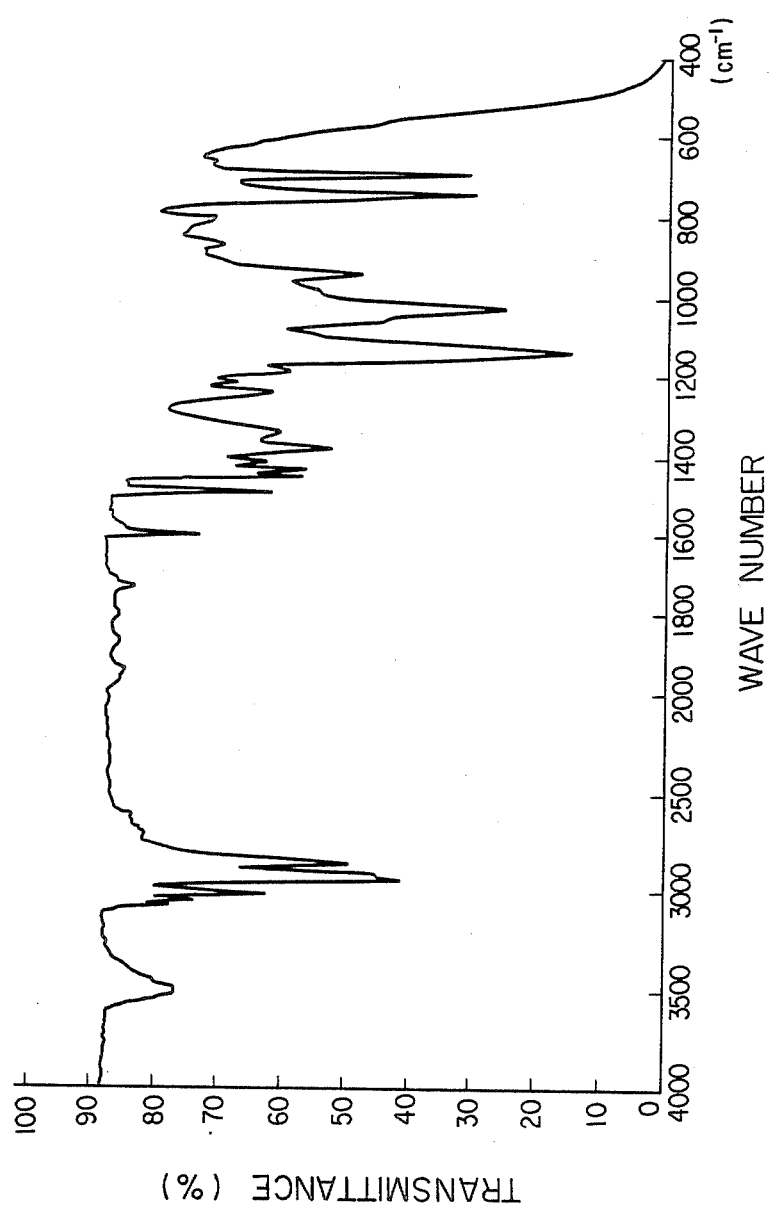

Infrared spectrum was measured on a film of this polymer formed on an NaCl plate. The results are shown in FIG. 2.

REFERENCE EXAMPLE 3

The procedures of Reference Example 1 were repeated except for using 70 parts of p-tolylacetaldehyde dimethyl acetal instead of phenylacetaldehyde. As a result, 18 parts of a polymer was obtained.

This polymer was subjected to elemental analysis. The results are as follows:

| Elemental Analysis | | |
| --- | --- | --- |
| | C | H |
| Measured | 74.78% | 8.11% |
| Calculated | 74.78% | 7.99% |

The calculated values were obtained assuming that the polymer had the following formula [V]:

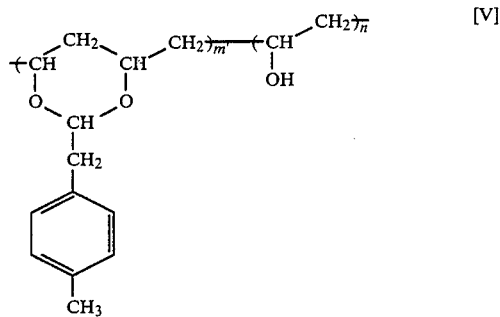  [V]

wherein m' is 0.725 and n is 0.275.

The measured values of carbon and hydrogen percentages in the polymer well coincide with the values calculated from the formula [V].

Figure 3:
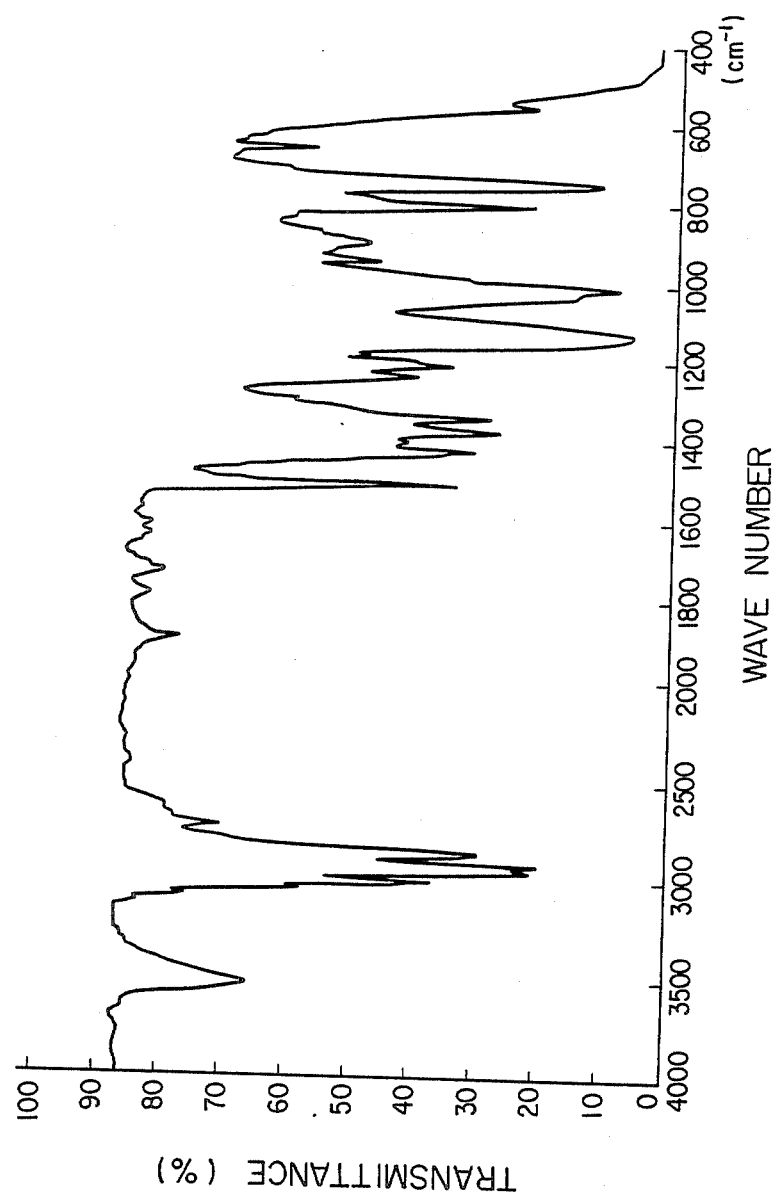

Infrared spectrum was measured on a film of this polymer formed on an NaCl plate. The results are shown in FIG. 3.

EXAMPLE 1

0.5 part of polyvinyl acetal prepared in Reference Example 1 having the following formula:

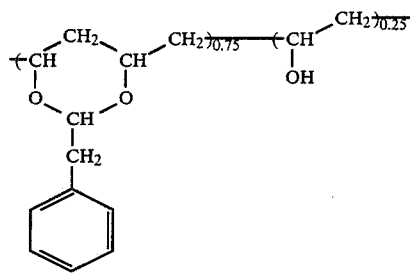

and 1 part of a bisazo pigment having the following formula:

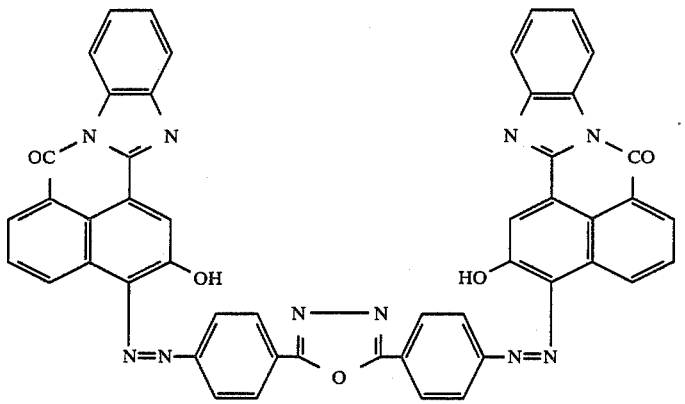

were pulverized to fine particles by a sand grinder in 100 parts of tetrahydrofuran to provide a coating fluid.

This coating fluid was applied by a film applicator to an aluminum vapor deposition layer formed on a 75-μm-thick polyester film so that the amount of the bisazo pigment coated was 0.25 g/m², and then dried to provide a charge carrier generating layer.

This charge carrier generating layer was coated with a 20-μm-thick charge carrier transport layer consisting of 90 parts of N-methyl-3-carbazolecarbaldehyde diphenylhydrazone represented by the following formula:

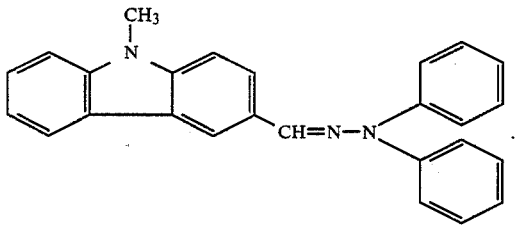

2 parts of 4-(p-nitrobenzoyloxy)benzalmalononitrile and 100 parts of a polycarbonate resin (NOVAREX 7025A manufactured by Mitsubishi Chemical Industries Ltd.) by coating to provide a photosensitive member for electrophotography.

This photosensitive member was measured with respect to sensitivity which was expressed by half-decay exposure ($E\frac{1}{2}$) by means of an electrophotographic paper test machine (Model SP-428 manufactured by Kawaguchi Denki Seisakusho K.K.). The measurement was carried out by giving a negative charge to the photosensitive member by corona discharge whose voltage was set to provide 22-μA corona current in the dark, and then exposing it to a tungsten lamp of 5 lux to determine the amount of light exposure ($E\frac{1}{2}$) necessary for reducing the surface potential of the photosensitive member by half from $-450$ V to $-225$ V. As a result, the half-decay exposure of this photosensitive member was 0.7 lux·sec. Further, the amount of light exposure consumed for reducing the surface potential to one-fifth from $-450$ V to $-90$ V was 1.3 lux·sec. After 10 seconds of exposure, the surface potential of the photosensitive membser was sufficiently reduced and leveled off at $-4$ V, which was residual potential.

This photosensitive member was formed on an aluminum drum and tested with a plain paper copier (SF-8200 manufactured by Sharp Corp.). Since it had very high sensitivity, the test was performed with light exposure reduced by adjusting an exposure dial.

As a result, even after 20,000 copying the decrease in am image concentration was not observed, and extremely good copies were obtained without fogging. This means that this photosensitive member has extremely high durability.

COMPARATIVE EXAMPLE 1

Example 1 was repeated except for using polyvinyl butyral (S'LEC B manufactured by Sekisui Chemical Co., Ltd.) instead of the polyvinyl acetal of Example 1 to produce a photosensitive member.

This photosensitive member had sensitivity of 0.9 lux sec for $E\frac{1}{2}$ and 1.7 lux·sec for $E_{1/5}$ and residual potential of $-4$ V.

It is thus evident that the polyvinyl acetal of the present invention used in Example 1 is superior to the conventional polyvinyl butyral not only in dispersion stability for pigments but also in enhancing the sensitivity of photosensitive members.

EXAMPLE 2

Example 1 was repeated to produce a photosensitive member except for using instead of the bisazo pigment crystalline oxytitanium phthalocyanine showing an X-ray diffraction spectrum having no diffraction peaks at Bragg angles ($2\theta \pm 0.2°$) of 9 or less and strong diffraction peaks at Bragg angles of 9.3°, 10.6°, 13.2°, 15.1°, 15.7°, 16.1°, 20.7°, 23.3°, 26.2° and 27.1° as shown in FIG. 4. The charge carrier transport layer was prepared to have a thickness of 13 μm.

The resulting photosensitive member had sensitivity of 0.58 lux·sec for $E\frac{1}{2}$ and 1.20 lux·sec for $E_{1/5}$ and residual potential of $-7$ V.

Incidentally, the above oxytitanium phthalocyanine was prepared by the following method:

First, 97.5 g of phthalodinitrile was added to 750 ml of α-chloronaphthalene, and 22 ml of titanium tetrachloride was dropped thereinto in a nitrogen atmosphere. After the completion of dropping, the reaction mixture was heated to temperatures of 200°–220° C. at which a reaction was caused to take place while stirring for 3 hours. It was then left to cool, and filtered at temperatures of 100°–130° C., and then washed with 200 ml of α-chloronaphthalene heated at 100° C. The resulting cake was washed in suspension with 300 ml of α-chloronaphthalene and then with 300 ml of methanol at room temperature. It was further subjected to washing in suspension with 800 ml of hot methanol for one hour several times. The cake was then suspended in 700 ml of hot water and washed for 2 hours. The resulting filtrate had pH of 1 or less. Washing in suspension with hot water was repeated until the pH of the filtrate became 6–7. Then, It was subjected to two-hour washing in suspension with 700 ml of N-methyl pyrrolidone (manufactured by Mitsubishi Chemical Industries Ltd.) at 140°–145° C. four times. Finally, washing in suspension with 800 ml of hot methanol was carried out twice to obtain the above oxytitanium phthalocyanine.

COMPARATIVE EXAMPLE 2

The same procedures as in Example 2 were carried out to produce a photosensitive member except for using polyvinyl butyral used in Comparative Example 1 instead of the polyvinyl acetal of Example 2.

The resulting photosensitive member had sensitivity of 0.70 lux·sec for $E_{\frac{1}{2}}$ and 1.64 lux·sec for $E_{1/5}$ and residual potential of −17 V.

The comparison with Example 2 shows that the polyvinyl acetal of the present invention is more effective not only for increasing sensitivity but also for reducing residual potential, which means that it is highly effective for the generation and injection of carriers in a laminate-type photosensitive member.

EXAMPLES 3–8

Example 2 was repeated to produce photosensitive members except for using instead of the polyvinyl acetal of Example 2 polyvinyl acetal represented by the following general formula:

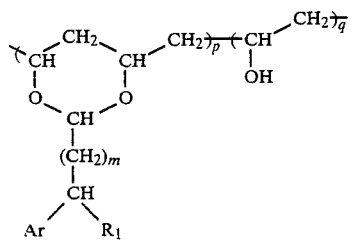

wherein Ar, $R_1$, m, p and q were as shown in Table 1. Incidentally, the values of p and q were determined by elemental analysis. Sensitivity was measured on each photosensitive member. The results are shown in Table 1.

TABLE 1

| Example No. | Ar | $R_1$ | m | p | q | $E_{\frac{1}{2}}$ (lux·sec) |
|---|---|---|---|---|---|---|
| 3 | –C₆H₄–CH₃ | H | 0 | 0.73 | 0.27 | 0.58 |
| 4 | –C₆H₄–OCH₃ | H | 0 | 0.74 | 0.26 | 0.56 |
| 5 | –C₆H₄–Cl | H | 0 | 0.72 | 0.28 | 0.70 |
| 6 | –C₆H₅ | H | 1 | 0.75 | 0.25 | 0.60 |
| 7 | –C₆H₅ | CH₃ | 0 | 0.75 | 0.25 | 0.62 |
| 8 | –naphthyl | H | 0 | 0.72 | 0.28 | 0.60 |

EXAMPLE 9

1 part of oxytitanium phthalocyanine used in Example 2 and 1 part of polyvinyl acetal produced in Reference Example 2 were pulverized to fine particles by a sand grinder in 80 parts of tetrahydrofuran to prepare a coating fluid. This coating fluid was applied by a film applicator onto an aluminum vapor deposition layer formed on a 75-μm-thick polyester film to form an oxytitanium phthalocyanine-dispersed layer having a thickness of 10 μm after drying. The photosensitive member thus prepared was given a positive charge with corona discharge in a dark place and measured with respect to sensitivity. As a result, the half-decay exposure ($E_{\frac{1}{2}}$) of this photosensitive member was 0.91 lux·sec. It had residual potential of +8 V.

COMPARATIVE EXAMPLE 3

The same procedures as in Example 9 were repeated to prepare a pigment dispersion-type photosensitive member except for using polyvinyl butyral in Comparative Example 1 instead of the polyvinyl acetal of Example 9. Sensitivity was measured in the same way as in Example 9. However, substantially no drop of surface potential by light exposure was observed under this measurement condition, making it impossible to determine the sensitivity. This shows that the polyvinyl acetal of the present invention has excellent properties even when it is used in a pigment-dispersed photosensitive member containing no charge carrier transport medium.

EXAMPLE 10

Example 1 was repeated to produce a photosensitive member for electrophotography except for using polyvinyl acetal made in Reference Example 1 as a binder for the charge carrier transport layer instead of the polycarbonate resin in Example 1. The resulting photosensitive member had sensitivity ($E_{\frac{1}{2}}$) of 0.9 lux·sec and residual potential of −8 V.

After charging and exposing were repeated 2,000 times by the above test machine, it was observed that the surface potential of the photosensitive member was 99.7% of the initial level, which means that the surface potential is extremely stable.

EXAMPLE 11

Exmaple 10 was repeated to produce a photosensitive member except for using, instead of the polyvinyl acetal added to the charge carrier transport layer in Example 10, polyvinyl acetal represented by the following general formula:

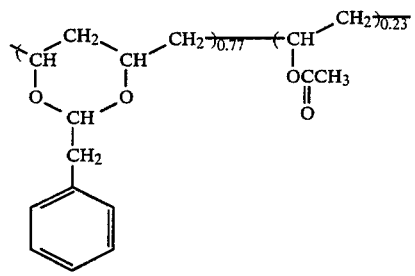

It was observed that the resulting photosensitive member had sensitivity ($E_{\frac{1}{2}}$) of 0.85 lux·sec and residual potential of −6 V.

EXAMPLE 12

0.5 part of 4-diethylaminobenzaldehyde diphenylhydrazone was dissolved in the oxytitanium phthalocyanine-dispersed coating fluid prepared in Example 9, and then coating and drying were carried out in the same way as in Example 9 to produce a photosensitive member having a pigment-dispersed layer. It was observed that the photosensitive layer had sensitivity ($E_{\frac{1}{2}}$) of 0.70 lux·sec and residual potential of +4 V.

As explained above, the polyvinyl acetate of the present invention has not only good dispersion stability for photoconductive particles but also good compatibility with various photoconductive compounds. Accordingly, it facilitates the formation of photosensitive members, and also it is superior to conventional binder polymers with respect to the separation and injection of charge carriers. Therefore, the use of such polyvinyl acetal provides the photosensitive members having higher sensitivity and lower residual potential than the conventional ones. In addition, the photosensitive members containing this polyvinyl acetal enjoy higher durability.

The present invention has been explained specifically above, but it should be noted that any modifications can be made unless they deviate from the scope of the present invention which is defined by the claims attached hereto.

What is claimed is:

1. A photosensitive member for electrophotography comprising at least a photoconductive layer on a conductive substrate, said photoconductive layer containing an organic photoconductive compound and a binder polymer, and said binder polymer comprising polyvinyl acetal having a repeating unit represented by the following general formula [I]:

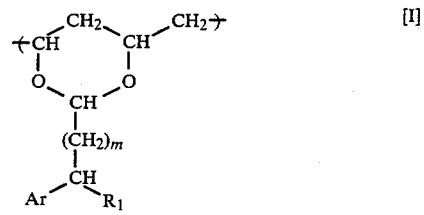

wherein Ar represents an aryl group, $R_1$ a hydrogen atom, a lower alkyl group or an aryl group, and m an integer of 0 or 1-3, and a repeating unit represented by the following general formula [II]:

wherein $R_2$ represents a hydrogen atom or an acyl group, said repeating unit of the general formula [I] being 40 mole % or more, and the total of said repeating units of the general formulae [I] and [II] being 60 mole % or more.

2. The photosensitive member for electrophotography according to claim 1, wherein said organic photoconductive compound is in the form of photoconductive particles dispersed in a binder.

3. The photosensitive member for electrophotography according to claim 2, said photoconductive layer contains a charge carrier-transporting medium.

4. The photosensitive member for electrophotography according to claim 1, wherein said photoconductive layer further contains a sensitizer.

5. The photosensitive member for electrophotography according to claim 1, wherein said photoconductive layer is a laminate composed of a charge carrier generating layer and a charge carrier transport layer, and said polyvinyl acetal is contained as a binder polymer in said charge carrier generating layer.

6. The photosensitive member for electrophotography according to claim 1, wherein said photoconductive layer is a laminate composed of a charge carrier generating layer and a charge carrier transport layer, and said polyvinyl acetal is contained as a binder polymer in said charge carrier transport layer.

7. The photosensitive member for electrophotography according to claim 1, wherein the repeating unit of the general formula [I] is 50 mole percent or more, and the total of the repeating units of the general formulae [I] and [II] is 70 mole percent or more in said polyvinyl acetal.

8. The photosensitive member for electrophotography according to claim 1, wherein Ar in the general formula [I] is a monovalent group derived from a substituted or unsubstituted aromatic hydrocarbon.

9. The photosensitive member for electrophotography according to claim 1, wherein $R_2$ in the general formula [II] is a lower aliphatic acyl group or an aromatic acyl group.

10. The photosensitive member for electrophotography according to claim 1, wherein $R_2$ in the general formula [II] is a hydrogen atom or an acetyl group.

* * * * *

UNITED STATES PATENT AND TRADEMARK OFFICE
CERTIFICATE OF CORRECTION

PATENT NO. : 4,734,348

DATED : March 29, 1988

INVENTOR(S) : T. Suzuki, T. Murayama, S. Aramaki

It is certified that error appears in the above—identified patent and that said Letters Patent is hereby corrected as shown below:

Please add the name of the Assignee on the Title Page as follows:

--Mitsubishi Chemical Industries Limited, Tokyo, Japan--.

Signed and Sealed this

Tenth Day of January, 1989

Attest:

DONALD J. QUIGG

*Attesting Officer*      *Commissioner of Patents and Trademarks*